(12) United States Patent
Hunter

(10) Patent No.: US 11,458,880 B1
(45) Date of Patent: Oct. 4, 2022

(54) LIVING QUARTERS FOR TRACTOR TRAILER TRUCKS

(71) Applicant: Jimmie Hunter, Tulsa, OK (US)

(72) Inventor: Jimmie Hunter, Tulsa, OK (US)

( * ) Notice: Subject to any disclaimer, the term of this patent is extended or adjusted under 35 U.S.C. 154(b) by 0 days.

(21) Appl. No.: 17/554,516

(22) Filed: Dec. 17, 2021

(51) Int. Cl.
*B60P 3/34* (2006.01)
*B60P 3/38* (2006.01)

(52) U.S. Cl.
CPC ...... *B60P 3/34* (2013.01); *B60P 3/38* (2013.01); *B60Y 2200/147* (2013.01)

(58) Field of Classification Search
CPC .................. B60P 3/34; B60P 3/32; B60P 3/38
USPC .......................... 296/165, 166, 164, 167, 175
See application file for complete search history.

(56) References Cited

U.S. PATENT DOCUMENTS

| | | | |
|---|---|---|---|
| 3,588,167 A * | 6/1971 | Ratcliff | B60P 3/34 52/66 |
| 4,111,479 A * | 9/1978 | Rizzotto, Sr. | B60P 3/38 135/150 |
| 4,176,873 A * | 12/1979 | Barr | B60P 3/38 296/210 |
| 4,206,943 A * | 6/1980 | Friedenberg | B62D 53/067 296/26.05 |
| 6,625,860 B1 | 9/2003 | Gernstein | |
| 6,883,860 B1 | 4/2005 | Budge | |
| 6,935,679 B2 | 8/2005 | Myers et al. | |
| 7,263,754 B1 | 9/2007 | Henry | |
| 7,445,271 B1 | 11/2008 | Henry | |
| 7,472,466 B2 | 1/2009 | Myers et al. | |
| 10,596,951 B1 | 3/2020 | Williams | |
| 2019/0300069 A1 * | 10/2019 | Angelo | B62D 9/00 |

FOREIGN PATENT DOCUMENTS

DE   3524994 A1 * 1/1987
GB   2043555 A * 10/1980

* cited by examiner

*Primary Examiner* — Joseph D. Pape
(74) *Attorney, Agent, or Firm* — Cramer Patent & Design, PLLC; Aaron R. Cramer

(57) ABSTRACT

A tractor trailer trucks living quarters is a sleeper for a truck cab which is secured above the roof of the truck. Beneath the midpoint of the sleeper is a sink, oven, bed and refrigerator. The roof of the sleeper may be raised when in use and lowered when not in use via a plurality of switches in communication with a power source.

12 Claims, 4 Drawing Sheets

LIVING QUARTERS FOR TRACTOR TRAILER TRUCKS

RELATED APPLICATIONS

Non-applicable.

FIELD OF THE INVENTION

The present invention relates to living quarters and more specifically living quarters for tractor trailer trucks.

BACKGROUND OF THE INVENTION

There are countless tractor-trailer trucks that crisscross our country every day. These large vehicles bring just about every object we touch in our daily lives to use. Many of these trucks have living areas behind the cab for the driver to sleep, cook, and relax. However, even the largest of these areas are still cramped.

Often, amenities such as toilets, full size beds, ranges, and the like are left out of even the most luxurious models. Other trucks, perhaps purchased used, have no such area, making them unsuitable for long haul travel. Finally, units that have a large berthing area also have a long wheelbase, making them more difficult to maneuver in cramped truck stops and loading docks. Accordingly, there exists a need for a means by which a tractor trailer truck can be provided with a large, luxurious, and comfortable berthing area. The development of the living quarters for tractor trailer trucks fulfills this need.

SUMMARY OF THE INVENTION

To achieve the above and other objectives, the present invention provides for a tractor trailer trucks living quarters that has, a floor having a top surface and a bottom surface, an upper housing having a front and a side, a lower housing exposed when lifting the upper housing, a pair of vertical support beams supporting the floor, and at least four linear operators raising and lowering the upper housing from the lower housing. The upper housing is lowered to the top surface of the floor. The pair of vertical support beams are adapted to be attached between the floor of the tractor trailer trucks living quarters and a front bumper area of the tractor trailer truck.

The front of the upper housing may include a curved leading surface to assist in air movement and improve gas mileage. The side of the upper housing may include a plurality of windows. The lower housing may have an emergency escape hatch allowing emergency egress to exit when access is blocked through a roof area. The emergency escape hatch may be disposed in a wall of the lower housing. An access panel may be disposed on the lower housing to allow access to a plurality of interior components which require access to outdoor ambient air. The lower housing may include a bed disposed at one end of the lower housing with a wardrobe storage area, while a second end houses a plurality of mechanical equipment as accessed through the access panel. The interior components may include a plurality of piping that is routed through the pair of vertical support beams. The piping may include a plurality of electric heat tracing to avoid freezing in cold climate operation. The interior components may be selected from the group consisting of an air conditioning system, a heating system, and a water heating system. The lower housing may include a sink, a propane range, a propane oven, one or more storage areas, a refrigerator, a plurality of 120 VAC receptacles, a plurality of USB charging receptacles, a plurality of lighting, a flat screen television, an AM/FM radio with Bluetooth interface for smart phone playback, and a plurality of additional storage closets. The tractor trailer trucks living quarters may further comprise a self-contained toilet, a cassette toilet or a composting toilet is located at the opposite end of the bed from the sink. The tractor trailer trucks living quarters may further comprise a portion of the rear lower housing that may include a see-through portion to see a floor hatch.

The floor hatch may include one or more hinges and a lift handle. The upper housing may overlap over the lower housing for weatherproofing accommodations by allowing water to drip over the upper housing and onto the lower housing. The at least four linear operators may be embedded in the upper housing providing for the raising and lowering operations. The at least four linear operators may include a mechanical bypass for emergency operation via an extended crank. The tractor trailer trucks living quarters may be a pop-up living area adapted to be disposed on top of a tractor-trailer truck. The tractor trailer trucks living quarters may be adapted to be connected to a roof of the tractor trailer truck. The tractor trailer trucks living quarters may be 13½ ft. or less to allow passage under standard height overpasses.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
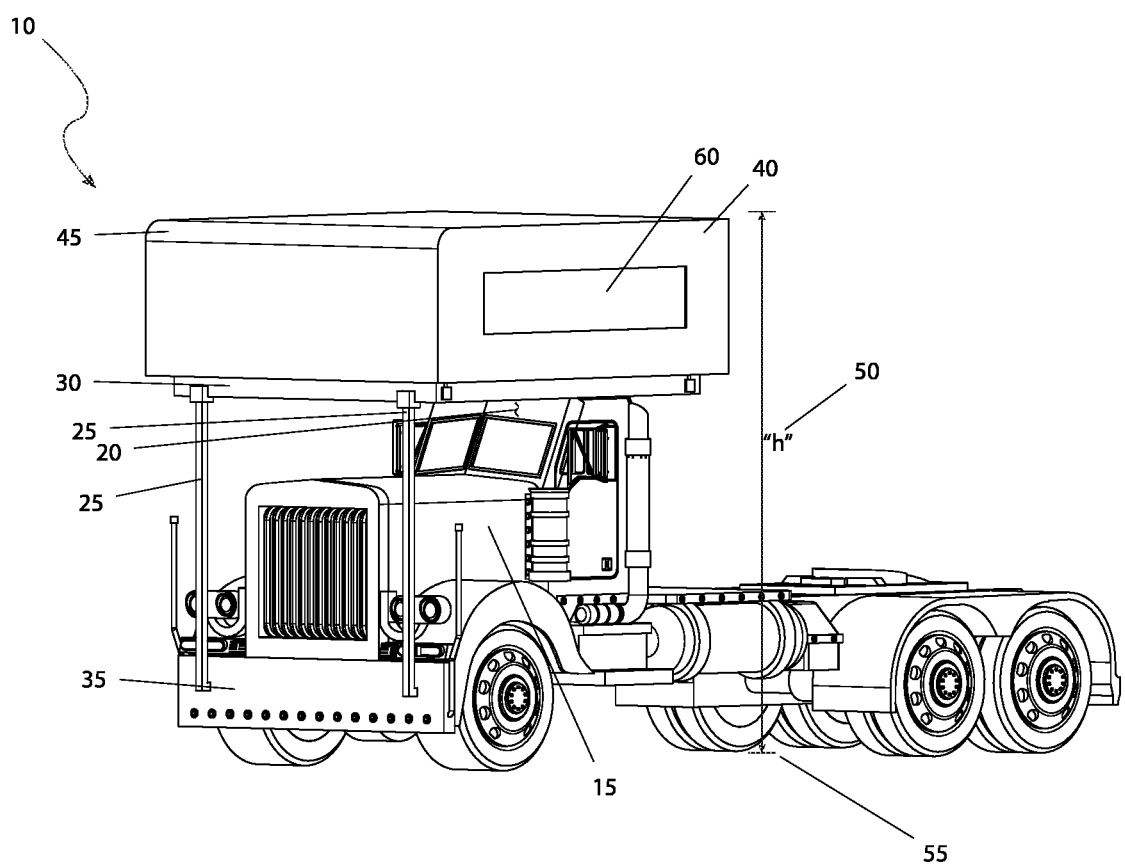
FIG. 1 is a perspective view of the living quarters for tractor trailer trucks, installed upon a tractor trailer truck, in a lowered position, according to the preferred embodiment of the present invention.

DESCRIPTIVE KEY 10 living quarters
15 tractor trailer truck
20 roof
25 vertical support beam
30 floor
35 front bumper area
40 upper housing
45 curved leading surface
50 overall height "h"
55 grade
60 window
65 lower housing
70 emergency escape hatch
75 access panel
80 driver's position 85 linear operator
90 mechanical bypass
91 water storage tank
92 propane storage tank
93 frame
95 bed
100 wardrobe storage area
105 sink
110 propane range
115 propane oven
120 storage area
125 refrigerator
130 self-contained toilet
135 floor hatch
140 hinge
145 handle
150 ladder rung
155 cab floor
160 cab seat

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the living quarters 10, installed upon a tractor trailer truck 15, in a lowered position, according to the preferred embodiment of the present invention is disclosed. The living quarters 10 provides a pop-up living area for the top of a tractor-trailer truck 15. The living quarters 10 is connected to the roof 20 of the tractor trailer truck 15 at the rear and supported by two (2) vertical support beams 25 which attaches between the floor 30 of the living quarters 10 and the front bumper area 35 of the tractor trailer truck 15. The living quarters 10 provides for an upper housing 40 that is lowered to the floor 30 during movement of the tractor trailer truck 15. The front of the upper housing 40 is provided with a curved leading surface 45 to assist in air movement over the living quarters 10 and improve gas mileage. In its lowered state as shown, the top of the upper housing 40 is at an overall height "h" 50 from the grade 55. The overall height "h" 50 is envisioned to be at or below thirteen and one-half feet (13½ ft.) to allow passage under standard height overpasses. The side of the upper housing 40 is provided with multiple windows 60 (one shown in FIG. 1 due to illustrative limitations) to allow for outward vision from the interior of the living quarters 10 when the upper housing 40 is in a raised position while the tractor trailer truck 15 is parked.

Figure 2:
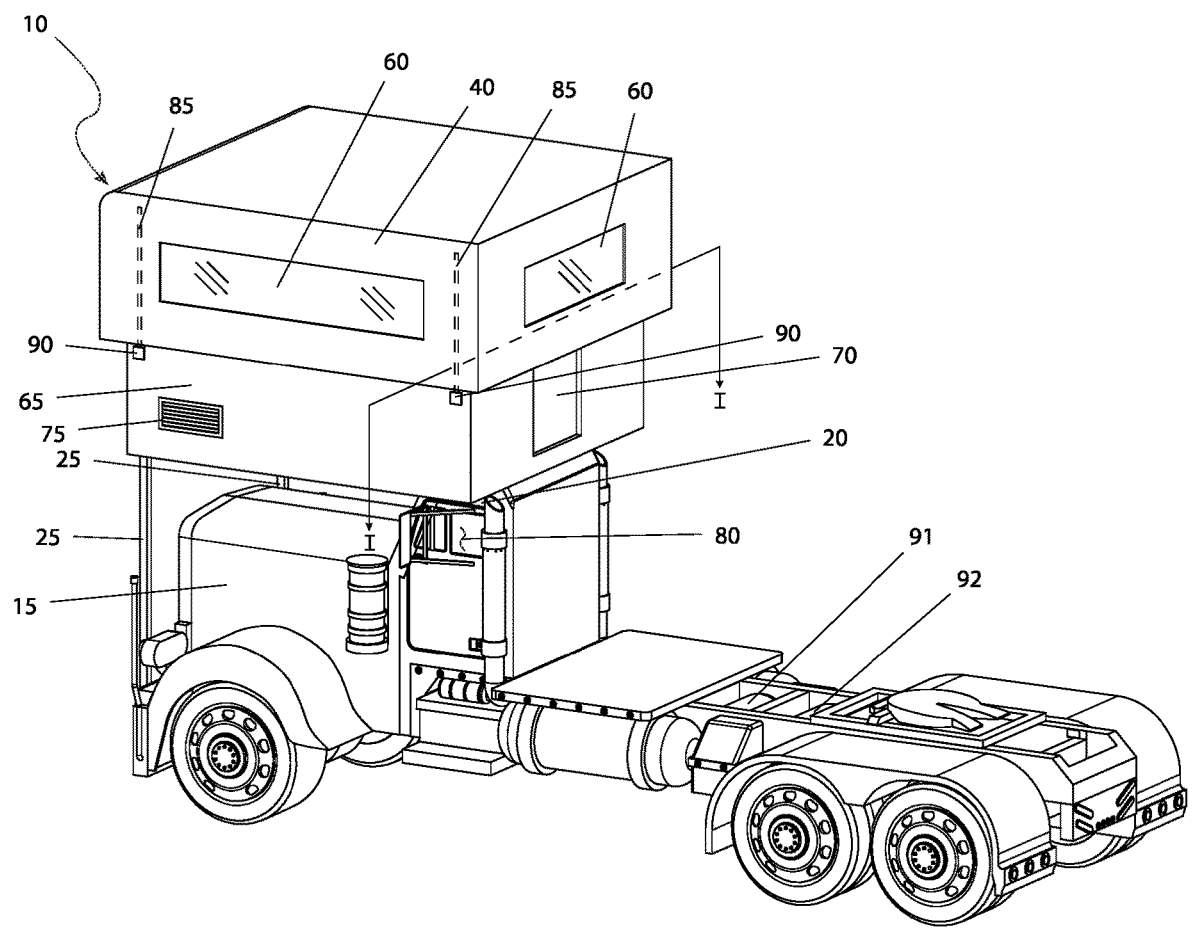
FIG. 2 is a perspective view of the living quarters for tractor trailer trucks, installed upon a tractor trailer truck, in a raised position, according to the preferred embodiment of the present invention.

Referring next to FIG. 2, a perspective view of the living quarters 10, installed upon a tractor trailer truck 15, in a raised position, according to the preferred embodiment of the present invention is depicted. The upper housing 40 is shown in its raised position, thus exposing a lower housing 65. As aforementioned described, the upper housing 40 is provided with multiple windows 60. The lower housing 65 is provided with an emergency escape hatch 70 that allows emergency egress for anyone inside of the living quarters 10 to exit when access is blocked through the normal roof 20 area. Egress action will be available regardless of whether or not a trailer (not shown) is hooked up to the tractor trailer truck 15.

An access panel 75 is provided on the lower housing 65 to allow access for interior components which require access to outdoor ambient air, including but not limited to air conditioning systems, heating systems, water heating systems and the like. Structural support for the living quarters 10 is provided by the roof 20 and the two (2) vertical support beams 25. Placement and size of the vertical support beams 25 is such that it will not interfere with forward vision from the driver's position 80 and are not unlike that of vertical supports used with other types of vehicles such as auto transport trucks and trailers. Raising and lowering of the upper housing 40 from the lower housing 65 is accomplished by at least four (4) linear operators 85 (of which only two (2) are shown, due to illustrative limitations). The linear operators 85 are envisioned to be electrically-, pneumatically-, or hydraulically-operated depending on preference and would also be provided with a mechanical bypass 90 for emergency operation via an extended crank. A water storage tank 91 and a propane storage tank 92 are located on the frame 93 of the tractor trailer truck 15. Piping for such systems is routed through the vertical support beams 25 and into the living quarters 10. It is envisioned that the water storage tank 91 and associated piping would be provided with electric heat tracing to avoid freezing in cold climate operation.

Figure 3:
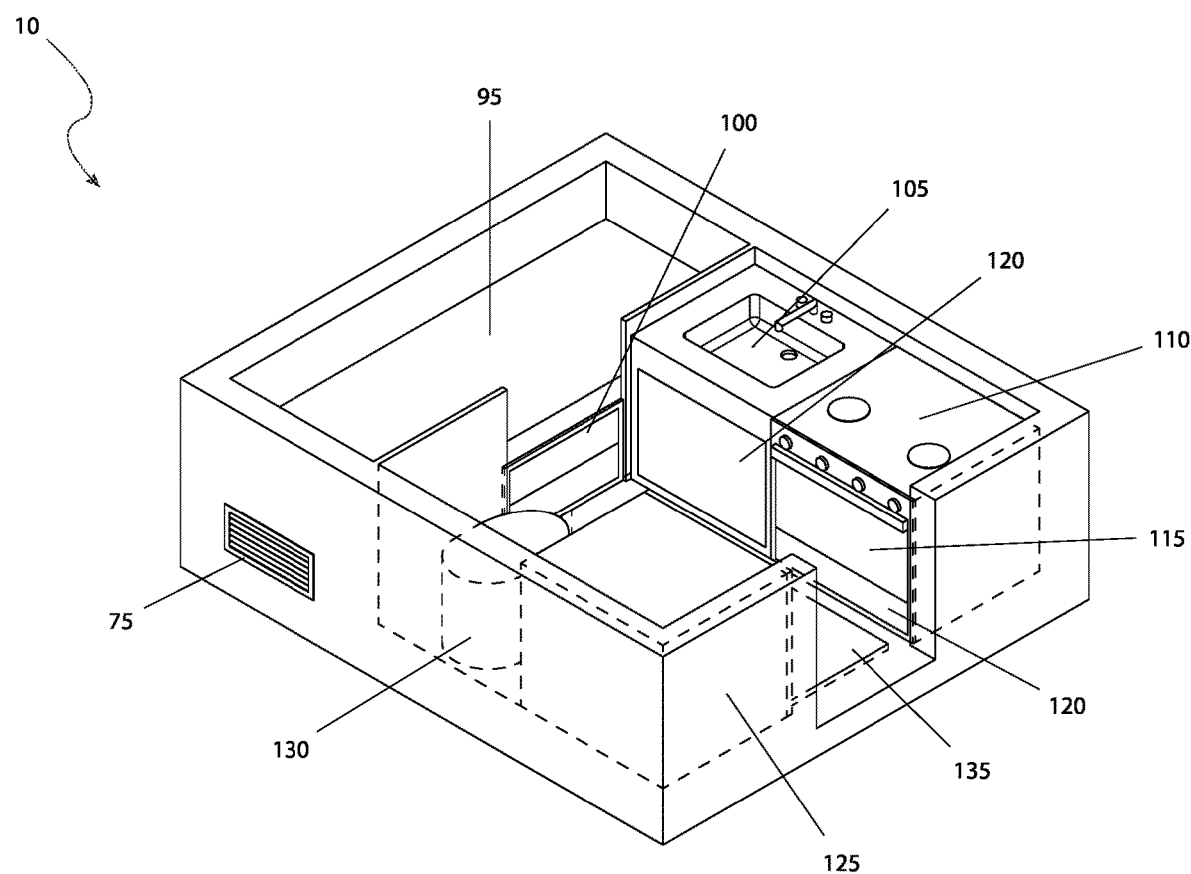
FIG. 3 is an interior perspective view of the lower housing, as used with the living quarters for tractor trailer trucks, according to the preferred embodiment of the present invention.

Referring now to FIG. 3, an interior perspective view of the lower housing 65, as used with the living quarters 10, according to the preferred embodiment of the present invention is shown. The overall interior dimensions of the lower housing 65 are envisioned to be approximately seventy-five inches (75 in.) wide, one-hundred-twenty inches (120 in.) long and forty inches (40 in.) tall. With the addition of the upper housing 40 (as shown in FIGS. 2 and 3), the overall interior height of the living quarters 10 is envisioned to be approximately eighty inches (80 in.) which allows for a full-size adult to stand. It is noted that the interior representation of the living quarters 10 is for illustrative purposes only. Other interior configurations can be easily accommodated by the teachings of the present invention. As such, the interior configuration as presenting in FIG. 3 should not be interpreted as a limiting factor of the present invention. A bed with the approximate dimensions of seventy-five inches (75 in.) long and fifty-four inches (54 in.) wide, is located at one end of the lower housing 65. It is provided with a wardrobe storage area 100 at a first end, while the opposite second end houses mechanical equipment as accessed through the access panel 75. Moving in a clockwise direction around the lower housing 65 from the bed 95, is a sink 105, a propane range 110, a propane oven 115, storage areas 120 and a refrigerator 125. The refrigerator 125 is envisioned to operate on twelve-volts direct current (12 VDC) as supplied by the electrical system of the tractor trailer truck 15 (as shown in FIGS. 1 and 2). A self-contained toilet 130, such as a cassette toilet or composting toilet is located at the opposite end of the bed 95 from the sink 105. A portion of the rear lower housing 65 is depicted in a see-through state to allow for visualization of a floor hatch 135. When in a raised state, access from the living quarters 10 to the tractor trailer truck 15 is granted. Further detail on the floor hatch 135 will be provided herein below. Other internal options for the lower housing 65 include but are not limited to or depicted in FIG. 3, are one hundred twenty-volt alternating current (120 VAC) receptacles, USB charging receptacles, lighting, flat screen television, AM/FM radio with Bluetooth® interface for smart phone playback, additional storage closets and the like.

Figure 4:
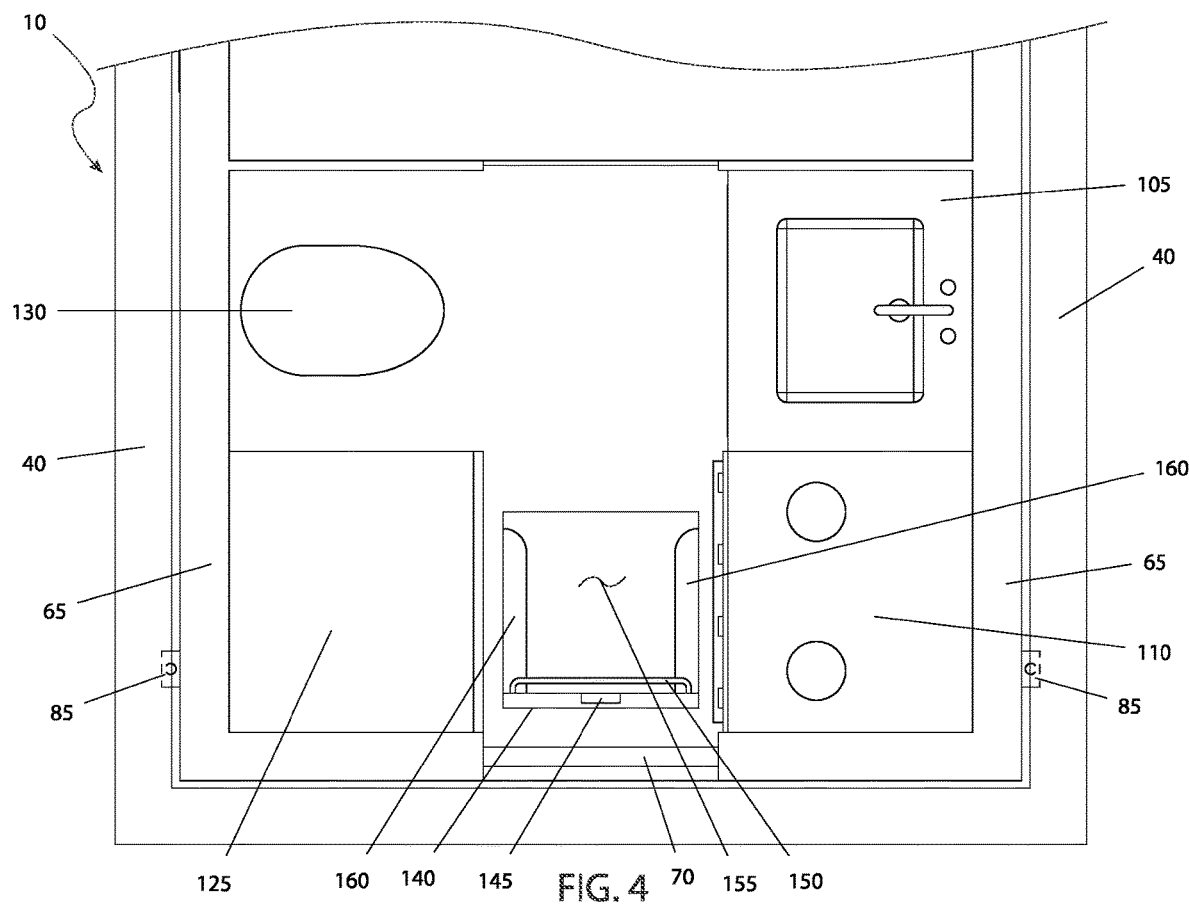
FIG. 4 is a sectional view of the living quarters for tractor trailer trucks, as seen along a Line I-I, as shown in FIG. 2, according to the preferred embodiment of the present invention.

Referring to FIG. 4, a sectional view of the living quarters 10, as seen along a Line I-I, as shown in FIG. 2, according to the preferred embodiment of the present invention is disclosed. This view depicts the floor hatch 135 in an open position complete with hinges 140 and a lift handle 145. When in an open position, the user may climb from the interior of the tractor trailer truck 15 up ladder rungs 150 and into the living quarters 10. The cab floor 155 and the cab seats 160 are visible through the opening of the floor hatch 135. When in a closed state, (as shown in FIG. 3), the user is afforded access to the refrigerator 125, the propane range 110 and the propane oven 115 (not shown in this FIG. due to illustrative limitations. The upper housing 40 is shown on the outside of the lower housing 65 allowing for raising and lowering operations. The overlapping nature of the upper housing 40 over the lower housing 65 provides weatherproofing accommodations by allowing water to drip over the upper housing 40 and onto the lower housing 65. The linear operators 85 are shown embedded in the wall of the upper housing 40 providing for the raising and lowering operation. The emergency escape hatch 70 is shown in the wall of the lower housing 65.

2. Operation of the Preferred Embodiment

The preferred embodiment of the present invention can be utilized by the common user in a simple and effortless manner with little or no training. It is envisioned that the living quarters 10 would be constructed in general accordance with FIG. 1 through FIG. 4. The user would procure the living quarters 10 from conventional procurement channels such as recreational vehicle suppliers, trucking equipment companies, tractor truck manufacturers and the like. Special attention would be paid to various amenities and options that are described herein above depending on the user's preferences. It is envisioned that the living quarters 10 would be provided as standard or optional equipment on a new tractor trailer truck 15 as well as being made available as an add-on kit for existing tractor trailer truck 15.

In the case of aftermarket installation, after procurement and prior to utilization, an opening in the roof of the tractor trailer truck 15 would be cut; with the aid of an overhead crane or lift, the living quarters 10 would be set in place atop the tractor trailer truck 15 and secured to the roof; the vertical support beams 25 would be placed between the floor 30 of the living quarters 10 and the front bumper area 35 of the tractor trailer truck 15 and secured in place; twelve volt electrical connections would be made from the tractor trailer truck 15 to all internal electrical items in the living quarters 10; the water storage tank 91 and the propane storage tank 92 would be connected to the frame 93 of the tractor trailer truck 15 and interconnecting piping would be installed. At this point in time, the living quarters 10 is ready for use.

During utilization of the living quarters 10, the following procedure would be initiated: during transport, the living quarters 10 would be configured as shown in FIG. 1; when arriving at a destination where living quarters are desired, the user would verify adequate clear space above the tractor trailer truck 15; the linear operators 85 would be operated via a switch placed on the dash of the tractor trailer truck 15 to raise the upper housing 40 as shown in FIG. 2; the user would then climb up the ladder rungs 150 and open the floor hatch 135 to gain access to the interior of the living quarters 10. The user would then sleep, eat, relax, process paperwork, or perform other activities associated with living quarters 10.

After use of the living quarters 10, the user would vacate the living quarters 10 through the floor hatch 135 and leave the living quarters 10; the upper housing 40 would then be lowered, allowing the tractor trailer truck 15 to drive away and continue with trucking duties.

The features of the living quarters 10 provide the following benefits compared to conventional living quarters on tractor trailer truck 15: a long wheelbase truck is not required for a large living quarter 10, it is permanently attached in place, the living quarters 10 include a full-size bed 95, a kitchen with refrigerator 125, range 120, oven 115, and sink 105, it includes a self-contained toilet 130, the location of the floor hatch 135 allows the refrigerator 125 to be reached while standing in the truck cab below even with the upper housing 40 lowered, and it can be used as a camper on days off for recreation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:
1. A tractor trailer trucks living quarters, comprising:
a floor having a top surface and a bottom surface;
an upper housing having a front and a side, the upper housing is lowered to the floor;
a lower housing exposed when lifting the upper housing;
a pair of vertical support beams supporting the floor, the pair of vertical support beams are adapted to be attached between the floor of the tractor trailer trucks living quarters and a front bumper area of the tractor trailer truck; and
at least four linear operators raising and lowering the upper housing from the lower housing
wherein an access panel disposed on the lower housing to allow access to the plurality of interior components are positioned within the lower housing and are in communication with outdoor ambient air, where an access panel disposed on the lower housing allows direct access to the plurality of interior components;
wherein the lower housing includes a bed disposed at one end of the lower housing with a wardrobe storage area, while a second end houses a plurality of mechanical equipment as accessed through the access panel;

wherein the interior components include a plurality of piping that is routed through the pair of vertical support beams;

wherein the piping includes a plurality of electric heat tracing to avoid freezing in cold climate operation;

wherein the interior components are selected from the group consisting of an air conditioning system, a heating system, and a water heating system;

wherein the floor includes a floor hatch, and the rear wall of the lower housing includes a see-through portion to permit the floor hatch to be viewed through the see-through portion from outside of the living quarters; and, wherein the floor hatch includes one or more hinges and a lift handle.

2. The tractor trailer trucks living quarters, according to claim 1, wherein the front of the upper housing includes a curved leading surface to assist in air movement and improve gas mileage.

3. The tractor trailer trucks living quarters, according to claim 1, wherein the side of the upper housing includes a plurality of windows.

4. The tractor trailer trucks living quarters, according to claim 1, wherein the lower housing having an emergency escape hatch allowing emergency egress.

5. The tractor trailer trucks living quarters, according to claim 4, wherein the emergency escape hatch is disposed in a wall of the lower housing.

6. The tractor trailer trucks living quarters, according to claim 1, wherein the lower housing includes a sink, a propane range, a propane oven, one or more storage areas, a refrigerator, a plurality of 120 VAC receptacles, a plurality of USB charging receptacles, a plurality of lighting, a flat screen television, an AM/FM radio with Bluetooth interface for smart phone playback, and a plurality of additional storage closets.

7. The tractor trailer trucks living quarters, according to claim 6, further comprising a self-contained toilet, a cassette toilet or a composting toilet is located at the opposite end of a bed from the sink.

8. The tractor trailer trucks living quarters, according to claim 1, wherein the upper housing overlaps over the lower housing for weatherproofing accommodations by allowing water to drip over the upper housing and onto the lower housing.

9. The tractor trailer trucks living quarters, according to claim 1, wherein the at least four linear operators are embedded in the upper housing providing for the raising and lowering operations.

10. The tractor trailer trucks living quarters, according to claim 1, wherein the tractor trailer trucks living quarters is a pop-up living area adapted to be disposed on top of a tractor-trailer truck.

11. The tractor trailer trucks living quarters, according to claim 1, wherein the tractor trailer trucks living quarters is adapted to be connected to a roof of the tractor trailer truck.

12. The tractor trailer trucks living quarters, according to claim 1, wherein the tractor trailer trucks living quarters is 13½ ft. or less to allow passage under standard height overpasses.

* * * * *